United States Patent [19]

Gleason et al.

[11] Patent Number: 4,557,557

[45] Date of Patent: Dec. 10, 1985

[54] METHOD OF MAKING AN OPTICAL FIBER ATTENUATOR USING A LOSSY FUSION SPLICE

[75] Inventors: Robert F. Gleason, Freehold; John McLay, Holmdel, both of N.J.

[73] Assignee: AT&T Bell Laboratories, Murray Hill, N.J.

[21] Appl. No.: 546,735

[22] Filed: Oct. 28, 1983

[51] Int. Cl.$^4$ .............................................. G02B 5/14
[52] U.S. Cl. ........................ 350/96.21; 350/96.10; 350/96.20; 350/96.15; 65/4.1; 65/4.2; 65/4.21
[58] Field of Search ............... 350/96.15, 96.10, 96.20, 350/96.21, 96.22; 250/227; 65/4.1, 4.2, 4.21

[56] References Cited

U.S. PATENT DOCUMENTS

| 3,825,319 | 7/1974 | Cook | 350/96.15 |
| 4,261,640 | 4/1981 | Stankos | 350/96.15 |

FOREIGN PATENT DOCUMENTS

| 52-68426 | 6/1977 | Japan | 350/96.21 |
| 53-108452 | 9/1978 | Japan | 350/96.21 |
| 55-79402 | 6/1980 | Japan | 350/96.21 |
| 55-95918 | 7/1980 | Japan | 350/96.21 |

OTHER PUBLICATIONS

Hatakeyama et al., "Fusion Splices for Single Mode Optical Fibers", IEEE J. of Quant. Elect., vol. QE-14, No. 8, 8/78, pp. 614–619.

Bisbee, "Splicing Silica Fibers with an Electric Arc", Applied Optics, vol. 15, No. 3, 3/76, pp. 796–798.

Primary Examiner—William L. Sikes
Assistant Examiner—Brian M. Healy
Attorney, Agent, or Firm—Richard B. Havill

[57] ABSTRACT

A method for fabricating an optical attenuator includes the following steps. Measuring the magnitude of optical loss imposed on an optical signal transmitted through first and second abutted optical fibers. Aligning the abutted ends of the first and second optical fibers for minimum distributed optical signal loss through both optical fibers, as measured at the far end of the second optical fiber. Heating the abutted ends of the first and second optical fibers into a plastic state. Physically distorting the optical fiber ends until the measured optical signal loss increases by a desired additional lumped optical loss value. Cooling the abutted ends of the first and second optical fibers to form a fusion splice imposing the desired additional lumped optical loss value between the ends of the first and second optical fibers.

2 Claims, 4 Drawing Figures

METHOD OF MAKING AN OPTICAL FIBER ATTENUATOR USING A LOSSY FUSION SPLICE

BACKGROUND OF THE INVENTION

This invention relates to optical fibers and more particularly to a method for making a device for attenuating light signals coupled from one optical fiber to another.

In the prior art, optical attenuators are provided as separate piece parts which are inserted between the ends of two optical fibers by means of mechanical coupling devices. Inserting such an optical attenuator into a system adds not only the attenuator itself but also the mechanical coupling devices. It is well known that system reliability is reduced by any increase in the number of separate components, or devices, used in the system. Thus the insertion of the optical attenuator plus the coupling devices not only increases optical loss but also reduces system reliability.

For an undersea optical fiber transmission system requiring very high reliability, it is desirable to insert an optical attenuator in between the ends of two optical fibers by using the lowest possible number of separate parts to retain high reliability while increasing optical loss. Thus there is a problem in inserting an optical attenuator between the ends of two optical fibers without reducing reliability.

SUMMARY OF THE INVENTION

This problem is solved by employing an advantageous method for fabricating an optical attenuator between the ends of two optical fibers using the following steps.

Measuring the magnitude of distributed optical loss imposed on an optical signal transmitted from an end of a first optical fiber through the first optical fiber and an abutted second optical fiber. Aligning the abutted optical fiber ends for minimum distributed optical signal loss through both optical fibers, as measured at a far end of the second fiber. Heating the abutted end of the first and second optical fibers into a plastic state. Physically distorting the optical fiber ends until the measured optical signal loss increases by a desired additional lumped optical loss value. Cooling the abutted ends of the first and second optical fibers to form a fusion splice that imposes the desired additional lumped optical loss value between the ends of the first and second optical fibers.

BRIEF DESCRIPTION OF THE DRAWING

A better understanding of the invention may be gained from the following detailed description when it is read with reference to the drawing wherein.

DETAILED DESCRIPTION

Figure 1:
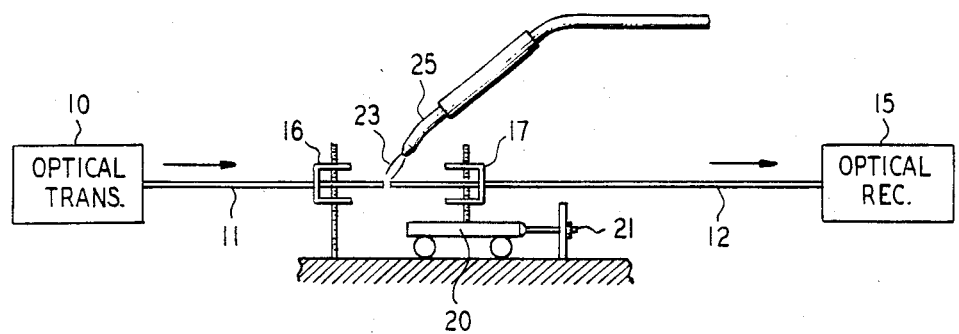
FIG. 1 is a schematic diagram of apparatus for performing the disclosed method.

Referring now to FIG. 1, there is shown an arrangement for making a device for attenuating optical signals transmitted through an optical fiber transmission line. An optical transmitter, or source, 10 is coupled optically to an input end of an optical fiber 11. Source 10 includes a laser or a light emitting diode, which is arranged to emit light into the input end of the core of the optical fiber 11. Another optical fiber 12 has a near end abutted against a far end of the optical fiber 11. An output end of the optical fiber 12 is coupled optically to an optical receiver 15, which includes a photodiode or the like. The optical fibers 11 and 12 form an optical transmission line between the optical transmitter 10 and the optical receiver 15.

Along the optical fibers 11 and 12, distributed optical loss is imposed on any optical signal transmitted from the transmitter 10 through the fibers. By design choice, the distributed optical loss imposed by the optical fibers 11 and 12 is less than a predetermined desired value of optical loss between the optical transmitter 10 and the optical receiver 15.

An advantageous method for imposing additional lumped optical loss into the fiber transmission line is described hereinafter. The inserted additional lumped optical loss will equal the difference between the distributed optical loss imposed by the fibers and the predetermined desired value of optical loss.

The far end of the optical fiber 11 is constrained by a fixed clamping device 16 and the near end of the optical fiber 12 is held by a movable clamping device 17. A micromanipulator arrangement with three degrees of freedom is used for the movable clamping device 17. To initiate the method, the far end of the optical fiber 11 is clamped in place in the clamping device 16. Then the near end of the optical fiber 12 is clamped in the clamping device 17 and moved so that the axes of the optical fibers 11 and 12 are aligned axially as nearly as possible. Correct axial alignment of the fiber ends is determined by measuring a maximum received power level at the optical receiver 15, as is known in the art. Once the axes are so aligned, the near end of the optical fiber 12 is moved axially so that the far end of the optical fiber 11 and the near end of the optical fiber 12 are abutted snuggly to each other.

It is noted that the movable clamping device 17 is mounted on a carriage 20 which is relatively free to move along the direction of the axis of the optical fiber 12. A position adjusting arrangement 21, such as a screw or the like, causes the end of the optical fiber 12 to move along its axis.

Figure 2:
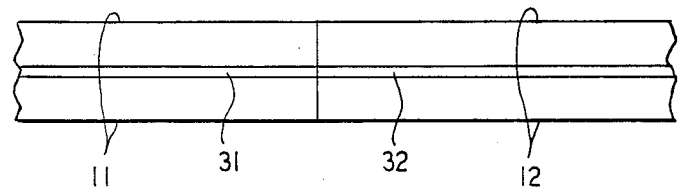
FIG. 2 is a sectional view along the center line of a pair of optical fibers spliced together in axial alignment.

Referring now to FIG. 2, there is shown a blown-up view of the far end of the optical fiber 11 abutted with the near end of the optical fiber 12. Their cores 31 and 32 are aligned axially. After the fiber ends are so abutted with the measured received optical power at a maximum, the insertion of the building out lumped optical loss commences.

A heat source, such as a flame 23 from a torch 25, heats the abutted ends of the optical fibers 11 and 12 until those abutted ends reach a plastic state, in accordance with practice well known in the art. Another heat source, such as a laser or an electric arc, can be used. While the heat is applied, the optical signal is continually transmitted through the optical fibers 11 and 12 and is monitored at the optical receiver 15. When the ends of the optical fibers reach the plastic state, the carriage 20 is moved gradually toward the optical fiber 11.

While the carriage 20 is being moved, the received optical power is monitored continuously. The movement of the carriage puts the abutted ends of the optical fibers into compression and they deform. The resulting deformation is the abutted optical fiber ends imposes an additional lumped optical loss in the molten ends of the optical fibers. When the imposed additional lumped optical loss reaches a value where the total optical loss between the transmitter 10 and the receiver 15 equals the predetermined desired value of optical loss, the movement of the carriage 20 is stopped. This predetermined desired value of optical loss reduces the received optical power to a desired level.

As soon as the predetermined desired value of optical loss is reached in the optical fibers 11 and 12, the flame 23, or other heat source, is removed from the region where the optical fiber ends abut. The optical fiber ends cool down to form a fusion splice that imposes a value of lumped optical loss equal to the desired value of additional loss.

In the fusion slice region at the abutted ends of the optical fibers, the core and cladding of the two fibers is distorted from the shape associated with the usually desired low loss shape, which is similar to the shape shown in FIG. 2.

Figure 3:
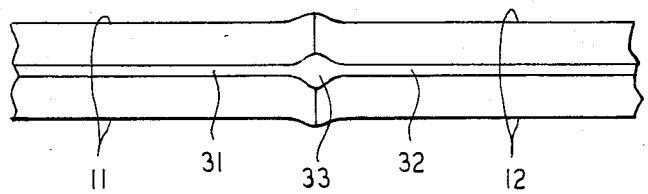
FIG. 3 is a sectional view along the centerline of a pair of optical fibers spliced together in axial alignment but with the ends of the cores deformed into a mushroom shape.

Referring now to FIG. 3, there is shown a condition that occurs when the axes of the cores of the optical fibers remain in line during the fiber distortion step. As the abutted optical fiber ends are moved together axially and compressed, the ends of the cores 31 and 32 mushroom out forming a wide region 33 which imposes the desired additional lumped optical loss between the optical fibers 11 and 12.

Figure 4:
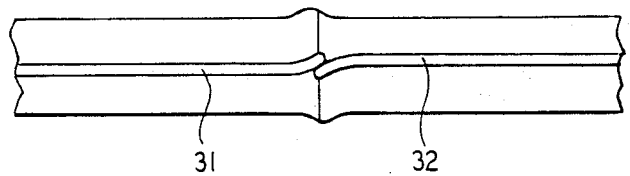
FIG. 4 is a sectional view along the centerline of a pair of optical fibers spliced together with ends of the core axes misaligned.

In FIG. 4 there is shown another condition, which occurs when the axes of the optical fibers are slightly offset one from the other while the carriage 20 of FIG. 1 is being moved. In FIG. 4 as the ends of the optical fibers are compressed, the cores 31 and 32 bend slightly near their abutted ends and are partially or wholly misaligned. This misalignment of the fiber cores 31 and 32 imposes the desired additional lumped optical loss between the fibers 11 and 12.

The foregoing describes a method for imposing a desired additional lumped optical loss in an optical fiber transmission line. No extra piece parts are required. Mechanical strength of the final fusion splice and subsequent reliability of system operation are maintained at high levels. This method together with others made obvious in view thereof are considered to be within the scope of applicants' claim.

What is claimed is:

1. A method for fabricating an optical attenuator comprising the steps of:
    measuring the magnitude of distributed optical loss imposed on an optical signal transmitted through first and second abutted optical fibers;
    aligning the abutted ends of the first and second optical fibers for minimum distributed optical signal loss through both optical fibers, as measured at the far end of the second optical fiber;
    heating the abutted and aligned ends of the first and second optical fibers into a plastic state;
    while the ends are in the plastic state moving one of the abutted ends axially for physically distorting the optical fiber ends until the measured optical signal loss increases by a desired additional lumped optical loss value; and
    cooling the abutted ends of the first and second optical fibers to form a fusion splice imposing the desired additional lumped optical loss value between the ends of the first and second optical fibers and assuring a high level mechanical strength through the splice and along the fibers.

2. A method for fabricating an optical attenuator comprising the steps of:
    constantly measuring the magnitude of distributed optical loss imposed on an optical signal transmitted through first and second abutted optical fibers:
    initially aligning the abutted ends of the first and second optical fibers for minimum distributed optical signal loss through both optical fibers, as measured at the far end of the second optical fiber;
    thereafter heating the abutted and aligned ends of the first and second optical fibers into a plastic state;
    while the ends are in the plastic state moving one of the abutted ends axially for physically distorting the optical fiber ends until the measured optical signal loss increases by a desired additional lumped optical loss value; and
    cooling the abutted ends of the first and second optical fibers to form a fusion splice imposing the desired additional lumped optical loss value between the ends of the first and second optical fibers and assuring a high level mechanical strength through the splice and along the fibers.

* * * * *